Aug. 28, 1962
A. BENTLEY
3,051,283
GEAR TYPE HYDRAULIC COUPLING
Filed Dec. 15, 1958
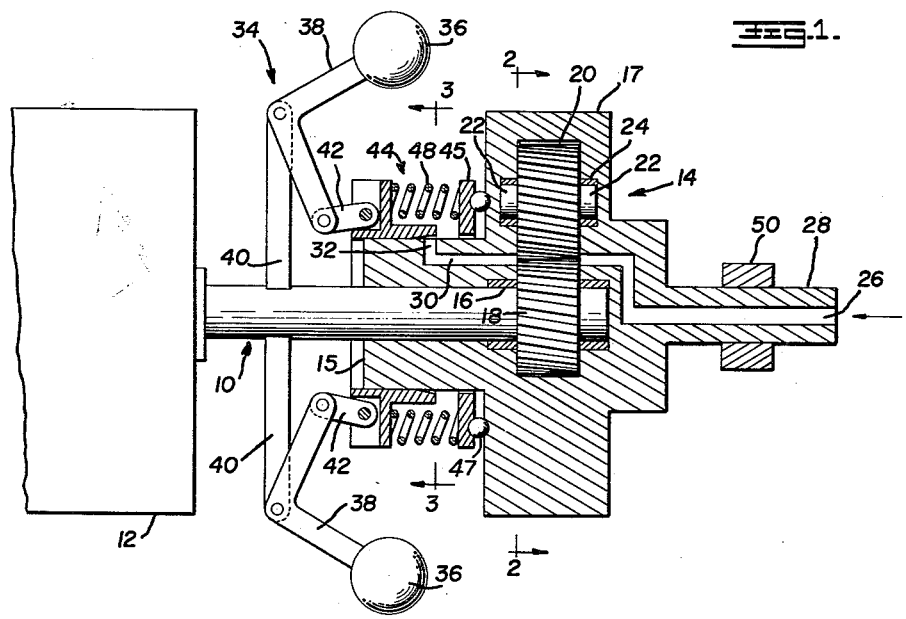
Fig.1.
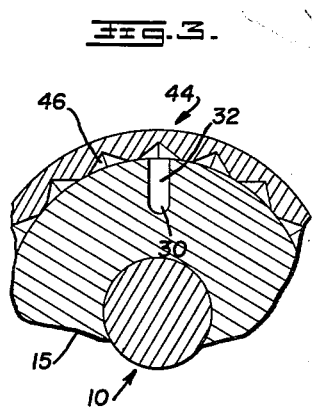
Fig.3.
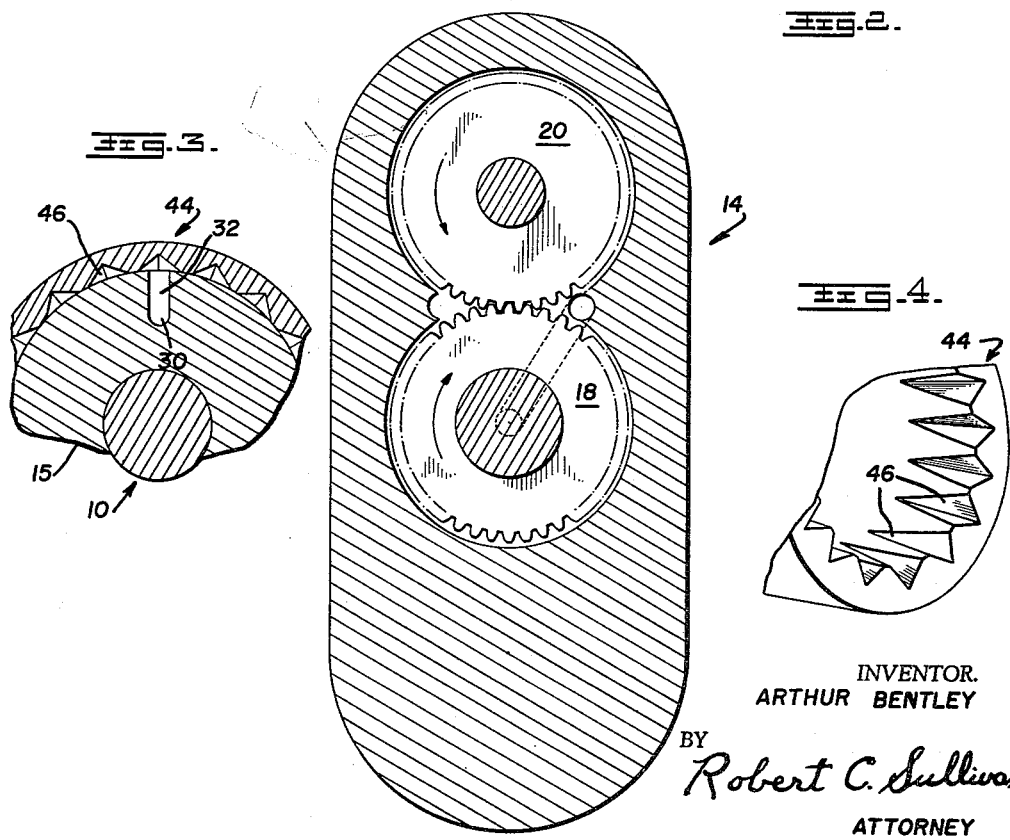
Fig.2.
Fig.4.
INVENTOR.
ARTHUR BENTLEY
BY *Robert C. Sullivan*
ATTORNEY

United States Patent Office 3,051,283
Patented Aug. 28, 1962

3,051,283
GEAR TYPE HYDRAULIC COUPLING
Arthur Bentley, Fredericksburg, Tex.
(11003 Auldine Drive, San Antonio 30, Tex.)
Filed Dec. 15, 1958, Ser. No. 780,522
11 Claims. (Cl. 192—61)

This invention relates to an automatic hydraulic transmission between a power input shaft and a power output shaft. The automatic transmission of the invention has particular utility in automotive vehicles and in machine tool drive mechanisms but is also useful in other installations requiring an automatic hydraulic power transmission.

It is an object of this invention to provide an automatic transmission between an input power shaft and an output power shaft which is relatively simple in construction and operation and much less complex than automatic transmissions of the prior art.

It is another object of the invention to provide an automatic transmission which provides a high torque build-up during the initial movement of the driven shaft from an idle position.

It is still another object of the invention to provide an automatic transmission which provides a smooth and progressive change in output speed from idling condition to a 1:1 speed ratio of the output to input shaft.

In achievement of these objectives, there is provided in accordance with this invention an automatic transmission in which the input shaft, which may be connected to the crankshaft of an automotive vehicle, for example, operates a driver gear within a transmission housing integrally connected to the output shaft. A mating gear within the same housing is driven by the driver gear to pump hydraulic fluid from an inlet to an outlet port of the housing. The degree of opening of the outlet port is controlled by a slidable ring valve which may be moved by centrifugally operated weights carried by the input shaft in such manner as to vary the degree of restriction at the outlet port. Restriction of fluid flow through the outlet port causes the power of the input drive shaft to be transmitted through the hydraulic fluid to the output shaft. In accordance with an important feature of the invention, the circumferential edge of the sliding ring valve which first approaches the outlet port has a plurality of circumferentially spaced V-type notches spaced apart by solid portions of the ring valve. The alternate notches and solid portions of the valve alternately open and close the outlet port with a resulting "sledge hammer" effect and high torque build-up at starting. At a predetermined input r.p.m., the sliding valve moves to a position in which the outlet port is completely covered, to thereby provide a 1:1 speed and torque ratio between the input and output shafts.

Further objects and advantages of the invention will become apparent from the following description taken in conjunction with the accompanying drawings in which:

FIG. 1 is a partially schematic view in longitudinal section of the automatic transmission of the invention;

FIG. 2 is a view along section line 2—2 of FIG. 1;

FIG. 3 is a fragmentary view along section line 3—3 of FIG. 1; and

FIG. 4 is an enlarged fragmentary perspective view looking in at the end of the ring valve.

Referring now to the drawings, there is shown an input power shaft generally indicated at 10 which may be rotatably driven by the crankshaft of an automotive internal combustion engine 12. Shaft 10 extends into a transmission housing generally indicated at 14 and is supported for rotation by a suitable bearing 16 within housing 14. A driver gear 18 is mounted on and turns with shaft 10 within housing 14. Gear 18 mates with a driven gear 20 carried by short stub shafts 22 which are supported for rotation by a bearing 24 within the radially outer portion of housing 14. A hydraulic liquid, such as oil, is supplied to the interior of housing 14 through an oil inlet passage 26 which, in the embodiment shown, extends as an axial passage through the output shaft 28 extending from and integral with one end of housing 14. Since the transmission housing 14 and output shaft 28 are integral with each other, the transmission housing 14 is in effect an element of the shaft 28. Oil inlet passage 26 teminates adjacent the region of meshing engagement of gears 18 and 20 which in effect serve as a positive displacement pump which delivers the hydraulic fluid to an outlet passage 30 terminating in an outlet port 32 in the outer periphery of reduced diameter portion 15 of transmission housing 14.

In order to control the degree of opening of outlet port 32 and hence control the power transmission from input shaft 10 to output shaft 28, as will be explained hereinafter, a centrifugal mechanism generally indicated at 34 is provided. Centrifugal mechanism 34 includes bob-weights 36 mounted upon bell cranks 38 which in turn are pivotally supported at the outer end of radial arms 40 carried by and rotatable with input shaft 10. The opposite end of each bell crank 38 is pivotally connected to a link member 42 which in turn is pivotally connected to a sliding ring-type valve generally indicated at 44. Valve 44 is rotatable about the outer periphery of the reduced diameter portion 15 of transmission housing 14 and is also axially slidably movable along portion 15 of housing 14 under the influence of centrifugal mechanism 34. Viewed in another manner, the reduced portion 15 of transmission housing 14 is an enlarged portion of shaft 28.

In accordance with an important feature of the invention, the peripheral portion of ring valve 44 which faces in the direction of outlet port 32 is provided with a plurality of circumferentially spaced notches 46, as best seen in the views of FIGS. 3 and 4. Each of the notches 46 is of V-shape in longitudinal section, as best seen in FIG. 1, so that the radial clearance between the notch and the outer periphery of transmission housing 14 is greatest at the outer end of the notch at the end periphery of ring valve 44, the clearance between the notch and the periphery of transmission housing 14 decreasing in approaching the inner end of the notch spaced from the end of ring valve 44. In the illustrated embodiment, notches 46 are also substantially V-shaped or isosceles-triangle shaped in cross section transverse of the longitudinal axis of the ring valve. It will be obvious that the cross-sectional area of the fluid passage through the respective notches 46 decreases progressively as the ring valve is progressively advanced further into overlying relation to the outlet port 32.

Ring valve 44 is biased away from outlet port 32 by spring members 48 which are interposed between the ring valve and the facing end of the larger diameter portion 17 of transmission housing 14. One end of each spring member 48 bears against the surface of ring valve 44, while the opposite end of the spring member bears against a ring member 45 supported by bearings 47 which in turn rest on the end wall of larger diameter portion 17 of transmission housing 14. The slidable ring valve 44 is moved by centrifugal bob-weights 36 in the direction of outlet port 32 against the counterbiasing force of springs 48. Springs 48 are so selected that ring valve 44 is in a position in which outlet port 32 is completely uncovered when engine 12 and shaft 10 are at idling speed.

*Operation*

In describing the operation of the apparatus hereinbefore described, it will be assumed that engine 12 is initially at idling speed. With the engine in idling condition, shaft 10 rotates relatively slowly and centrifugal bob-weights 36 are at a radial distance from shaft 10 such that valve 44 is further to the left than in the view shown in FIG. 1 so that outlet port 32 is completely uncovered.

With ring valve 44 in the position in which outlet port 32 is completely uncovered, the rotation of driver gear 18 and driven gear 20 within transmission housing 14 provides a pumping action which draws hydraulic fluid from the source of hydraulic fluid supply through inlet passage 26 and thence to outlet port 32, from whence the hydraulic fluid passes back to the supply source. In this condition, transmission housing 14 is stationary and hence output shaft 28 which is integral with housing 14 is also stationary. Thus, while input shaft 10 turns at idling speed, there is no rotation of transmission housing 14 and of the connected output shaft 28.

Assume now that shaft 10 is speeded up from its idling condition in such manner as to cause centrifugal bob-weights 36 to move radially outwardly. This causes ring valve 44 to slide in the direction of outlet port from the idle position just described in which outlet port 32 is completely uncovered until it substantially reaches the position shown in FIG. 1 in which the notched periphery of ring valve 44 overlies outlet port 32. As ring valve 44 in overlying position to outlet port 32 rotates with respect to the initially stationary transmission housing 14, the serrated or notched end periphery of the ring valve alternately opens and closes the outlet port 32 of the transmission housing. Thus, with ring valve 44 in the position shown in FIG. 1, whenever an unnotched portion of the ring valve moves past outlet port 32, there is a complete closure of the port and hence a complete restriction of fluid flow through the transmission housing. Whenever a notched portion of the ring periphery passes outlet port 32 there is a momentary passage of hydraulic fluid through the passing notch. During the intervals in which outlet port 32 is closed to passage of hydraulic fluid, the power of input shaft 10 and input gear 18 is transmitted through the trapped hydraulic fluid in the housing to produce a rotational torque upon transmission housing 14. This causes housing 14 to begin to move from its stationary position and to start to build up speed. During the initial movement of housing 14 from its rest position, a high starting torque for housing 14 and the connected output shaft 28 is produced by the alternate opening and closing of outlet port 32 by the notched periphery of ring valve 44. The notched or serrated peripheral edge of ring valve 44, with its alternate opening and closing of outlet port 32 produces what might be termed a "sledge hammer" effect on housing 14 which provides a high starting torque for the housing and drive shaft 28 connected thereto.

As the speed of the input shaft 10 increases still further, ring valve 44 is moved still farther to the right with respect to the view shown in FIG. 1. Due to the V-shaped cross section of the notches 46 in the direction of sliding movement, the clearance between the notches and the adjacent periphery of housing 14 progressively decreases, with a corresponding progressive decrease in the notch clearance through which the hydraulic fluid from outlet port may escape when the notch is in overlying relation to the outlet port. During this period, the speed differential between the input and output shafts progressively decreases. Finally, at a predetermined r.p.m. of drive shaft 10, the notched or serrated edge portion of ring valve 44 moves beyond outlet port 32 to the right with respect to the view of FIG. 1 and the solid ring portion of the valve entirely overlies outlet port 32. In this condition, escape of hydraulic liquid through outlet port 32 is entirely prevented, and transmission housing 14 with its connected drive shaft 28 are locked in a 1:1 speed and torque ratio with respect to input shaft 10.

When the automotive vehicle climbs an incline, the reverse procedure to that just described takes place. As the r.p.m. of the engine 12 decreases going up the incline, the centrifugal force of bob-weights 36 is overcome by the force of springs 48 and ring valve 44 moves from the 1:1 ratio position in which the ring valve completely overlies outlet port 32 to a position in which the notched serrated portion of the ring valve again overlies the outlet port. This provides an outlet for the hydraulic fluid locked within transmission housing 14, allows the engine to maintain an efficient r.p.m., and increases the driving torque on output shaft 28 to meet the requirements of the vehicle in moving up the incline.

In order to permit reverse movement of the automotive vehicle, a gear 50 is mounted on output shaft 28 and mates with suitable reversing gearing.

The hydraulic transmission hereinbefore described may also be used in machine tool applications to provide a predetermined r.p.m. of an output shaft. In such applications, the internal combustion engine 12 would be replaced by a constant speed prime mover, such as a constant speed electric motor. The centrifugal mechanism 34 of the embodiment of FIG. 1 would be replaced by a suitable adjusting mechanism, such as a manually or servo motor operated screw and nut mechanism operatively connected to the sliding ring valve, for positioning the sliding ring valve 44 in a predetermined position relative to outlet port 32, to thereby provide a predetermined desired output speed for shaft 28. In such case, the ring valve would be slidably keyed to drive shaft 10 for rotation therewith, and the screw and nut mechanism would be effective to move the ring valve to an adjusted position along its keyed connection to drive shaft 10.

It can be seen from the foregoing that there is provided in accordance with this invention an automatic transmission which has great utility and which is particularly useful when applied to automotive vehicles and machine tool drive mechanisms. The transmission of the invention is relatively simple in construction and operation and is far less complex than automatic transmissions of the prior art. The transmission provides a very high torque build-up with what may be termed a "sledge hammer" effect during the movement from idle position of the engine and provides a smooth and progressive change in output speed from idle position until a 1:1 ratio of input to output shafts is finally reached. When applied to a machine tool drive mechanism, the transmission of the invention permits an output shaft driven from a constant speed source to have its speed adjusted to a desired value over a wide range of r.p.m.

While there have been shown and described particular embodiments of the invention, it will be obvious to those skilled in the art that various changes and modifications may be made therein, and, therefore, it is aimed to cover all changes and modifications as fall within the true spirit and scope of the invention.

What I claim as my invention is:

1. A hydraulic transmission comprising a rotatable transmission housing, a first rotatable shaft, a rotary fluid pump means within said housing connected to and rotatable with said first shaft, a fluid inlet to and a fluid outlet from said housing in hydraulic circuit with said pump means whereby rotation of said pump means is effective to pump hydraulic fluid from said inlet to said outlet, said fluid outlet being located on a peripheral surface of said housing, a second shaft, one of said shafts being connected to and rotatably movable with said housing, a ring valve mounted for axially sliding movement along said peripheral surface of said housing and into radially outward overlying relation to said fluid outlet, said ring valve and said housing being mounted for relative rotation therebetween, said ring valve having a plurality of circumferentially displaced fluid passages therein with circumferentially spaced fluid flow restrictions interposed between successive fluid passages, and means for slidably moving said ring valve into overlying relation to said fluid outlet to intermittently permit and restrict fluid flow from said fluid outlet of said housing in accordance with the relative rotation between said ring valve and said fluid outlet.

2. A hydraulic transmission comprising a rotatable transmission housing, a rotatable drive shaft, a rotary fluid pump means within said housing driven by said drive shaft, a fluid inlet to and a fluid outlet from said housing in hydraulic circuit with said pump means whereby rotation of said pump means is effective to pump hydraulic fluid from said inlet to said outlet, said fluid outlet being located on a peripheral surface of said housing, a driven shaft, one of said shafts being connected to and rotatably movable with said housing, a ring valve mounted for axially sliding movement along said peripheral surface of said housing and into radially outward overlying relation to said fluid outlet, said ring valve and said housing being mounted for relative rotation therebetween, said ring valve having a plurality of circumferentially displaced fluid passages therein with circumferentially spaced fluid flow restrictions interposed between successive fluid passages, and means for slidably moving said ring valve into overlying relation to said fluid outlet to intermittently permit and restrict fluid flow from said fluid outlet of said housing in accordance with the relative rotation between said ring valve and said fluid outlet.

3. A hydraulic transmission comprising a rotatable transmission housing, a rotatable drive shaft, a rotary fluid pump means within said housing driven by said drive shaft, a fluid inlet to and a fluid outlet from said housing in hydraulic circuit with said pump means whereby rotation of said pump means is effective to pump hydraulic fluid from said inlet to said outlet, said fluid outlet being located on a peripheral surface of said housing, a driven shaft, one of said shafts being connected to and rotatably movable with said housing, a ring valve mounted for axially sliding movement along said peripheral surface of said housing and into radially outward overlying relation to said fluid outlet, said ring valve and said housing being mounted for relative rotation therebetween, means for slidably moving said ring valve into overlying relation to said fluid outlet to restrict fluid flow therethrough, the end periphery of said ring valve which first approaches said fluid outlet having a plurality of circumferentially spaced fluid passages therein and adapted to provide intermittent fluid passage from said fluid outlet in accordance with the relative rotation between said ring valve and said fluid outlet when said end periphery is in overlying relation to said fluid outlet.

4. A hydraulic transmission as defined in claim 3 in which said circumferentially spaced fluid passages are in the form of notched openings of V-shaped cross-section axially of said ring valve, the fluid passages progressively decreasing in cross-sectional area as said ring valve is progressively advanced further into overlying relation to said fluid outlet.

5. A hydraulic transmission comprising a rotatable transmission housing, a rotatable drive shaft, a rotary fluid pump means within said housing driven by said drive shaft, a fluid inlet to and a fluid outlet from said housing in hydraulic circuit with said pump means whereby rotation of said pump means is effective to pump hydraulic fluid from said inlet to said outlet, said fluid outlet being located on a peripheral surface of said housing, a driven shaft, one of said shafts being connected to and rotatably movable with said housing, a ring valve mounted for axially sliding movement along said peripheral surface of said housing and into radially outward overlying relation to said fluid outlet, said ring valve and said housing being mounted for relative rotation therebetween, the end periphery of said ring valve which first approaches said outlet having a plurality of circumferentially spaced fluid passages therein, and means for moving said ring valve from a neutral position in which said fluid outlet is completely uncovered to an intermediate position in which said end periphery having said plurality of circumferentially spaced fluid passages therein is in overlying relation to said outlet to provide an intermittent restriction of fluid flow through said outlet in accordance with the relative rotation between said ring valve and said outlet, to a final position in which said end periphery is out of registry with said outlet and said outlet is completely covered by said ring valve to prevent fluid flow through said outlet.

6. A hydraulic transmission comprising a rotatable transmission housing, a rotatable drive shaft, gear means within said housing driven by said drive shaft, a fluid inlet to and a fluid outlet from said housing in hydraulic circuit with said gear means whereby rotation of said gear means is effective to pump hydraulic fluid from said inlet to said outlet, said fluid outlet being located on a peripheral surface of said housing, a driven shaft, one of said shafts being connected to and rotatably movable with said housing, a ring valve mounted for axially sliding movement along said peripheral surface of said housing and into radially outward overlying relation to said fluid outlet, said ring valve and said housing being mounted for relative rotation therebetween said ring valve having a plurality of circumferentially displaced fluid passages therein with circumferentially spaced fluid flow restrictions interposed between successive fluid passages, and means for slidably moving said ring valve into overlying relation to said fluid outlet to intermittently permit and restrict fluid flow from said fluid outlet of said housing in accordance with the relative rotary movement between said ring valve and said fluid outlet.

7. A hydraulic transmission for converting a constant speed power input to a variable speed power output comprising a rotatable transmission housing, a constant speed rotatable drive shaft, a rotary fluid pump means within said housing driven by said drive shaft, a fluid inlet to and a fluid outlet from said housing in hydraulic circuit with said pump means whereby rotation of said pump means is effective to pump hydraulic fluid from said inlet to said outlet, said fluid outlet being located on a peripheral surface of said housing, a driven shaft, one of said shafts being connected to and rotatably movable with said housing, a ring valve mounted for axially sliding movement along said peripheral surface of said housing and into radially outward overlying relation to said fluid outlet, said ring valve and said housing being mounted for relative rotation therebetween, the end periphery of said ring valve which first approaches said outlet having a plurality of circumferentially spaced fluid passages therein and adapted to provide intermittent fluid passage from said outlet in accordance with the relative rotation between said ring valve and said outlet when said end periphery is in overlying relation to said outlet, and means for slidably moving said ring valve to an adjusted overlying position with respect to said fluid outlet to adjustably restrict fluid flow through said fluid outlet and thereby produce a fluid coupling between said pump means and said housing which rotates said housing and said driven shaft at a predetermined speed.

8. A hydraulic transmission as defined in claim 7 in which said circumferentially spaced fluid passages are in the form of notched openings of V-shaped cross-section axially of said ring valve, the fluid passages progressively decreasing in cross-sectional area as said ring valve is progressively advanced further into overlying relation to said fluid outlet.

9. A hydraulic transmission comprising a first rotatable shaft including a transmission housing carried by and rotatable with said first shaft, a second rotatable shaft, a rotary fluid pump means within said housing driven by one of said shafts, a fluid inlet to said housing, one of said shafts including a fluid outlet from said housing in hydraulic circuit with said pump means and said fluid inlet whereby rotation of said pump means is effective to pump hydraulic fluid from said inlet to said outlet, said fluid outlet being located on an annular surface of said shaft having said fluid outlet, one of said shafts being connected to and rotatably movable with said housing, a ring valve mounted for axial sliding movement along said annular surface of said shaft having said fluid outlet, said ring valve and said shaft having said fluid outlet being mounted for relative rotation therebetween, the end periphery of said ring valve which first approaches said fluid outlet having a plurality of circumferentially spaced fluid passages therein with circumferentially spaced fluid flow restrictions interposed between successive fluid passages, and means for slidably moving said ring valve into overlying relation to said fluid outlet to intermittently permit and restrict fluid flow from said fluid outlet in accordance with the relative rotary movement between said ring valve and said fluid outlet.

10. A hydraulic transmission comprising a first rotatable shaft including a transmission housing carried by and rotatable with said first shaft, a second rotatable shaft, a rotary fluid pump means within said housing connected to and rotatable with one of said shafts, a fluid inlet to said housing, one of said shafts including a fluid outlet from said housing in hydraulic circuit with said pump means and said fluid inlet whereby rotation of said pump means is effective to pump hydraulic fluid from said inlet to said outlet, said fluid outlet being located on a peripheral surface of said shaft having said fluid outlet, a ring valve mounted for axial sliding movement along said shaft having said fluid outlet, said ring valve and said shaft having said fluid outlet being mounted for relative rotation therebetween, said ring valve having a plurality of circumferentially spaced fluid passages therein with circumferentially spaced fluid flow restrictions interposed between successive fluid passages, and means for slidably moving said ring valve into overlying relation to said fluid outlet to intermittently permit and restrict fluid flow from said fluid outlet in accordance with the relative rotation between said ring valve and said fluid outlet.

11. A hydraulic transmission as defined in claim 10 in which said circumferentially spaced fluid passages are in the form of notched openings of V-shaped cross-section axially of said ring valve, the fluid passages progressively decreasing in cross-sectional area as said ring valve is progressively advanced further into overlying relation to said fluid outlet.

References Cited in the file of this patent
UNITED STATES PATENTS

| | | |
|---|---|---|
| 2,066,450 | Bascle et al. | Jan. 5, 1937 |
| 2,207,538 | Gaddoni | July 9, 1940 |
| 2,213,836 | Gaddoni | Sept. 3, 1940 |
| 2,282,395 | Carrigan | May 12, 1942 |
| 2,432,201 | Lilly | Dec. 9, 1947 |
| 2,677,326 | Schindele | May 4, 1954 |
| 2,827,993 | Moores | Mar. 25, 1958 |